(12) United States Patent
Goodchild et al.

(10) Patent No.: US 12,107,453 B2
(45) Date of Patent: *Oct. 1, 2024

(54) THERMAL REGULATION FOR WIRELESS CHARGING PAD

(71) Applicant: AIRA, INC., Phoenix, AZ (US)

(72) Inventors: Eric Heindel Goodchild, Phoenix, AZ (US); David Russell, Scottsdale, AZ (US)

(73) Assignee: Aira, Inc., Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/138,467

(22) Filed: Apr. 24, 2023

(65) Prior Publication Data

US 2023/0261503 A1  Aug. 17, 2023

Related U.S. Application Data

(63) Continuation of application No. 17/087,610, filed on Nov. 2, 2020, now Pat. No. 11,637,441.

(51) Int. Cl.
*H02J 7/00* (2006.01)
*H02J 7/04* (2006.01)
(Continued)

(52) U.S. Cl.
CPC ............ *H02J 7/04* (2013.01); *H02J 7/00041* (2020.01); *H02J 7/007194* (2020.01);
(Continued)

(58) Field of Classification Search
CPC ........................................................ H02J 7/04
(Continued)

(56) References Cited

U.S. PATENT DOCUMENTS

2001/0048289 A1  12/2001  Sakakibara
2012/0223590 A1*  9/2012  Low .................. H02J 50/12
                                                    307/104

(Continued)

FOREIGN PATENT DOCUMENTS

WO   2019022413 A1   1/2019

OTHER PUBLICATIONS

PCT/US2021/057019. International Search Report and Written Opinion mailed Feb. 2, 2022. (7 pages).

*Primary Examiner* — Edward Tso
*Assistant Examiner* — Ahmed H Omar
(74) *Attorney, Agent, or Firm* — Anthony Smyth; LOZA & LOZA, LLP

(57) ABSTRACT

A wireless charging device has a controller and at least one coil that is positioned near the surface of the charging device and configured to transmit an electromagnetic field and a first driver circuit configured to drive the transmitting coil. The controller is configured to cause the driver circuit to provide a charging current to the transmitting coil, decode a request for lower transmission power from a modulation of the charging current, reduce the amplitude of the charging current in accordance with the request for lower transmission power when a temperature measured at a surface of the charging device is less than a threshold temperature, and initiate a cool down sequence when the temperature measured at the surface of the charging device equals or exceeds the threshold temperature. In one example, the request for lower transmission power may be provided in an ASK-modulated signal superimposed on the charging current.

10 Claims, 14 Drawing Sheets

(51) Int. Cl.
*H02J 50/10* (2016.01)
*H02J 50/40* (2016.01)

(52) U.S. Cl.
CPC ............ *H02J 50/10* (2016.02); *H02J 50/402* (2020.01); *H02J 7/007192* (2020.01)

(58) Field of Classification Search
USPC ........................................................ 320/108
See application file for complete search history.

(56) References Cited

U.S. PATENT DOCUMENTS

| | | |
|---|---|---|
| 2012/0286724 A1 | 11/2012 | Tsai et al. |
| 2013/0088191 A1 | 4/2013 | Sutarwala et al. |
| 2013/0119929 A1 | 5/2013 | Partovi |
| 2014/0293538 A1 | 10/2014 | Han et al. |
| 2015/0069854 A1 | 3/2015 | Kim et al. |
| 2016/0181849 A1* | 6/2016 | Govindaraj ........... H02J 7/0044 320/108 |
| 2017/0025882 A1* | 1/2017 | Chien ............... H02J 7/007192 |
| 2017/0366035 A1 | 12/2017 | Meng et al. |
| 2018/0323648 A1 | 11/2018 | Joye et al. |
| 2019/0267828 A1 | 8/2019 | Goodchild et al. |
| 2020/0136421 A1 | 4/2020 | Kim et al. |
| 2020/0343765 A1* | 10/2020 | Kwon ...................... H02J 50/80 |
| 2021/0313820 A1* | 10/2021 | Yang ................... H02J 7/00309 |
| 2021/0313822 A1* | 10/2021 | Wan .................... H02J 7/00712 |
| 2022/0190622 A1 | 6/2022 | Kobayashi |
| 2022/0239155 A1* | 7/2022 | Yang ................. H02J 7/007194 |

\* cited by examiner

THERMAL REGULATION FOR WIRELESS CHARGING PAD

PRIORITY CLAIM

This application claims priority to and the benefit of non-provisional patent application Ser. No. 17/087,610 filed in the United States Patent Office on Nov. 2, 2020, which is hereby incorporated herein by reference as if fully set forth below in its entirety and for all applicable purposes.

TECHNICAL FIELD

The present invention relates generally to wireless charging of batteries, including batteries in mobile computing devices, and more particularly to detection and amelioration of overheating during charging.

BACKGROUND

Wireless charging systems have been deployed to enable certain types of devices to charge internal batteries without the use of a physical charging connection. Devices that can take advantage of wireless charging include mobile processing and/or communication devices. Standards, such as the Qi standard defined by the Wireless Power Consortium enable devices manufactured by a first supplier to be wirelessly charged using a charger manufactured by a second supplier. Standards for wireless charging are optimized for relatively simple configurations of devices and tend to provide basic charging capabilities.

Improvements in wireless charging capabilities are required to support continually increasing complexity of mobile devices and changing form factors. For example, there is a need for a faster, lower power detection techniques that enable a charging device to detect and locate chargeable devices on a surface of a charging device, and to detect removal or relocation of a chargeable device during a wireless charging operation.

DETAILED DESCRIPTION

Figure 1:
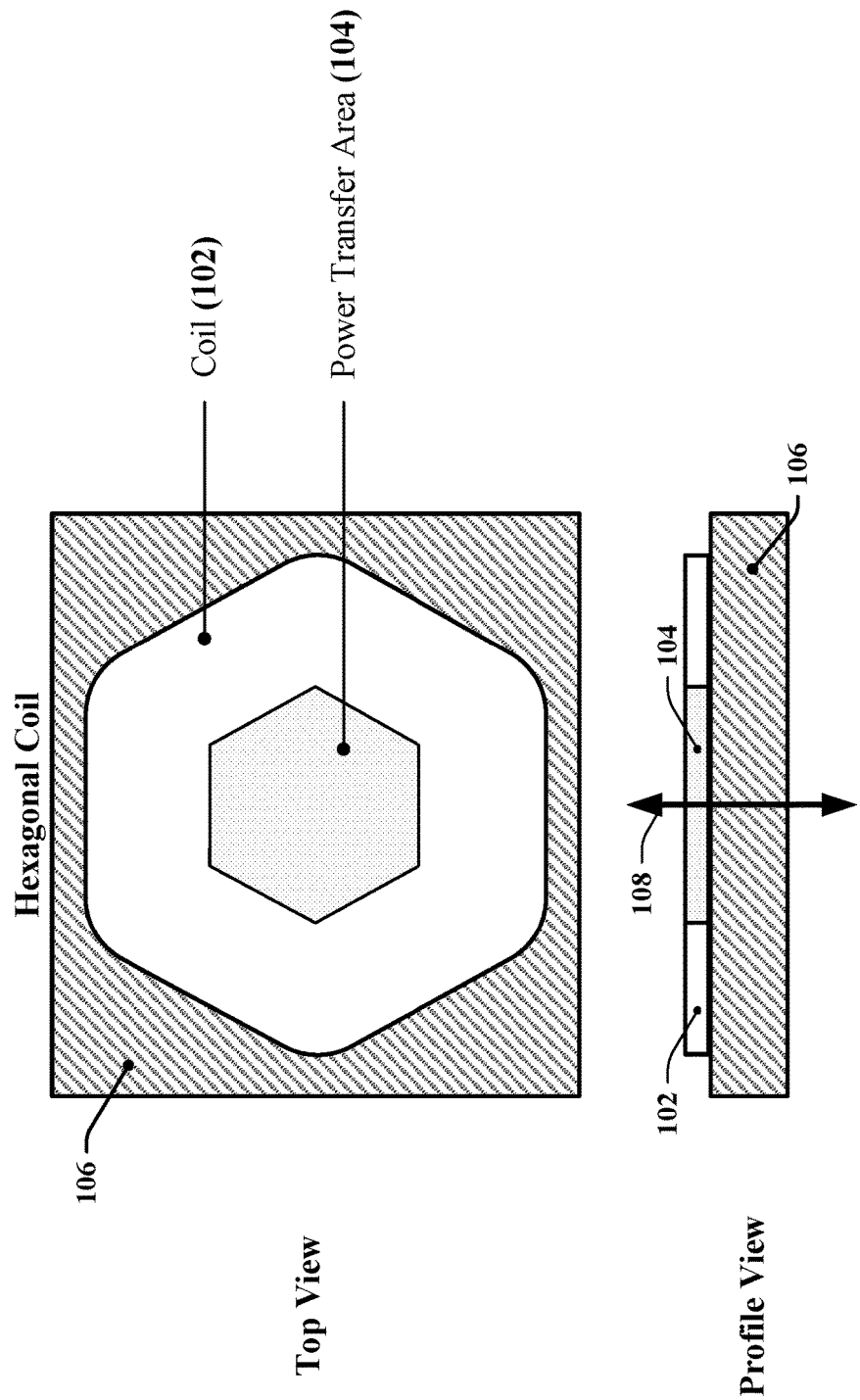
FIG. 1 illustrates an example of a charging cell that may be provided on a charging surface provided by a wireless charging device in accordance with certain aspects disclosed herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of wireless charging systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium. A processor-readable storage medium, which may also be referred to herein as a computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), Near Field Communications (NFC) token, random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Overview

Certain aspects of the present disclosure relate to systems, apparatus and methods applicable to wireless charging devices and techniques. Charging cells may be configured with one or more inductive coils to provide a charging surface in a charging device where the charging surface enables the charging device to charge multiple chargeable devices wirelessly. The location of a device to be charged may be detected through sensing techniques that associate location of the device to changes in a physical characteristic centered at a known location on the charging surface. Sensing of location may be implemented using capacitive, resistive, inductive, touch, pressure, load, strain, and/or another appropriate type of sensing.

In one aspect of the disclosure, an apparatus has a battery charging power source, a plurality of charging cells configured in a matrix, a first plurality of switches in which each switch is configured to couple a row of coils in the matrix to a first terminal of the battery charging power source, and a second plurality of switches in which each switch is configured to couple a column of coils in the matrix to a second terminal of the battery charging power source. Each charging cell in the plurality of charging cells may include one or more coils surrounding a power transfer area. The plurality of charging cells may be arranged adjacent to the charging surface of the charging device without overlap of power transfer areas of the charging cells in the plurality of charging cells.

In some instances, the apparatus may also be referred to as a charging surface. Power can be wirelessly transferred to a receiving device located anywhere on a surface of the apparatus. The devices can have an arbitrarily defined size and/or shape and may be placed without regard to any discrete placement locations enabled for charging. Multiple devices can be simultaneously charged on a single charging surface. The apparatus can track motion of one or more devices across the charging surface. Certain concepts disclosed herein apply equally to a charging device that has a single transmitting coil or charging cell.

In various aspects of the disclosure, a wireless charging device configured for multi-device charging may determine, calculate or estimate when an over-temperature condition exists in one of multiple devices being concurrently charged. The wireless charging device may take steps to reduce the temperature in a receiving device identified as having an overtemperature condition. The wireless charging device may configure a driver circuit to drive a transmitting coil positioned near the surface of the charging device, cause the driver circuit to provide a charging current to the transmitting coil, and decode a request for lower transmission power from a modulation of the charging current, determine whether an overtemperature condition exists or is indicated in a device being charged. The overtemperature condition may correspond to a temperature of a battery exceeding a maximum temperature defined by standards, protocol or designer. The overtemperature condition may be indicated when a temperature measured at the surface of the charging device exceeds a threshold temperature. The wireless charging device may reduce the amplitude of the charging current in accordance with the request for lower transmission power when a temperature measured at a surface of the charging device is less than the threshold temperature. The wireless charging device may initiate a cool down sequence when the temperature measured at the surface of the charging device equals or exceeds the threshold temperature.

Charging Cells

According to certain aspects disclosed herein, a charging surface may be provided using charging cells in a charging device, where the charging cells are deployed adjacent to the charging surface. In one example the charging cells are deployed in one or more layers of the charging surface in accordance with a honeycomb packaging configuration. A charging cell may be implemented using one or more coils that can each induce a magnetic field along an axis that is substantially orthogonal to the charging surface adjacent to the coil. In this description, a charging cell may refer to an element having one or more coils where each coil is configured to produce an electromagnetic field that is additive with respect to the fields produced by other coils in the charging cell and directed along or proximate to a common axis.

In some implementations, a charging cell includes coils that are stacked along a common axis and/or that overlap such that they contribute to an induced magnetic field substantially orthogonal to the charging surface. In some implementations, a charging cell includes coils that are arranged within a defined portion of the charging surface and that contribute to an induced magnetic field within the substantially orthogonal portion of the charging surface associated with the charging cell. In some implementations, charging cells may be configurable by providing an activating current to coils that are included in a dynamically defined charging cell. For example, a charging device may include multiple stacks of coils deployed across the charging surface, and the charging device may detect the location of a device to be charged and may select some combination of stacks of coils to provide a charging cell adjacent to the device to be charged. In some instances, a charging cell may include, or be characterized as a single coil. However, it should be appreciated that a charging cell may include multiple stacked coils and/or multiple adjacent coils or stacks of coils. The coils may be referred to herein as charging coils, wireless charging coils, transmitter coils, transmitting coils, power transmitting coils, power transmitter coils, or the like.

FIG. 1 illustrates an example of a charging cell 100 that may be deployed and/or configured to provide a charging surface of a charging device. As described herein, the charging surface may include an array of charging cells 100 provided on one or more substrates 106. A circuit comprising one or more integrated circuits (ICs) and/or discrete electronic components may be provided on one or more of the substrates 106. The circuit may include drivers and switches used to control currents provided to coils used to transmit power to a receiving device. The circuit may be configured as a processing circuit that includes one or more processors and/or one or more controllers that can be configured to perform certain functions disclosed herein. In some instances, some or all of the processing circuit may be provided external to the charging device. In some instances, a power supply may be coupled to the charging device.

The charging cell 100 may be provided in close proximity to an outer surface area of the charging device, upon which one or more devices can be placed for charging. The charging device may include multiple instances of the charging cell 100. In one example, the charging cell 100 has a substantially hexagonal shape that encloses one or more coils 102, which may be constructed using conductors, wires or circuit board traces that can receive a current sufficient to produce an electromagnetic field in a power transfer area 104. In various implementations, some coils 102 may have a shape that is substantially polygonal, including the hexagonal charging cell 100 illustrated in FIG. 1. Other implementations provide coils 102 that have other shapes. The shape of the coils 102 may be determined at least in part by the capabilities or limitations of fabrication technology, and/or to optimize layout of the charging cells on a substrate 106 such as a printed circuit board substrate. Each coil 102 may be implemented using wires, printed circuit board traces and/or other connectors in a spiral configuration. Each charging cell 100 may span two or more layers separated by an insulator or substrate 106 such that coils 102 in different layers are centered around a common axis 108.

Figure 2:
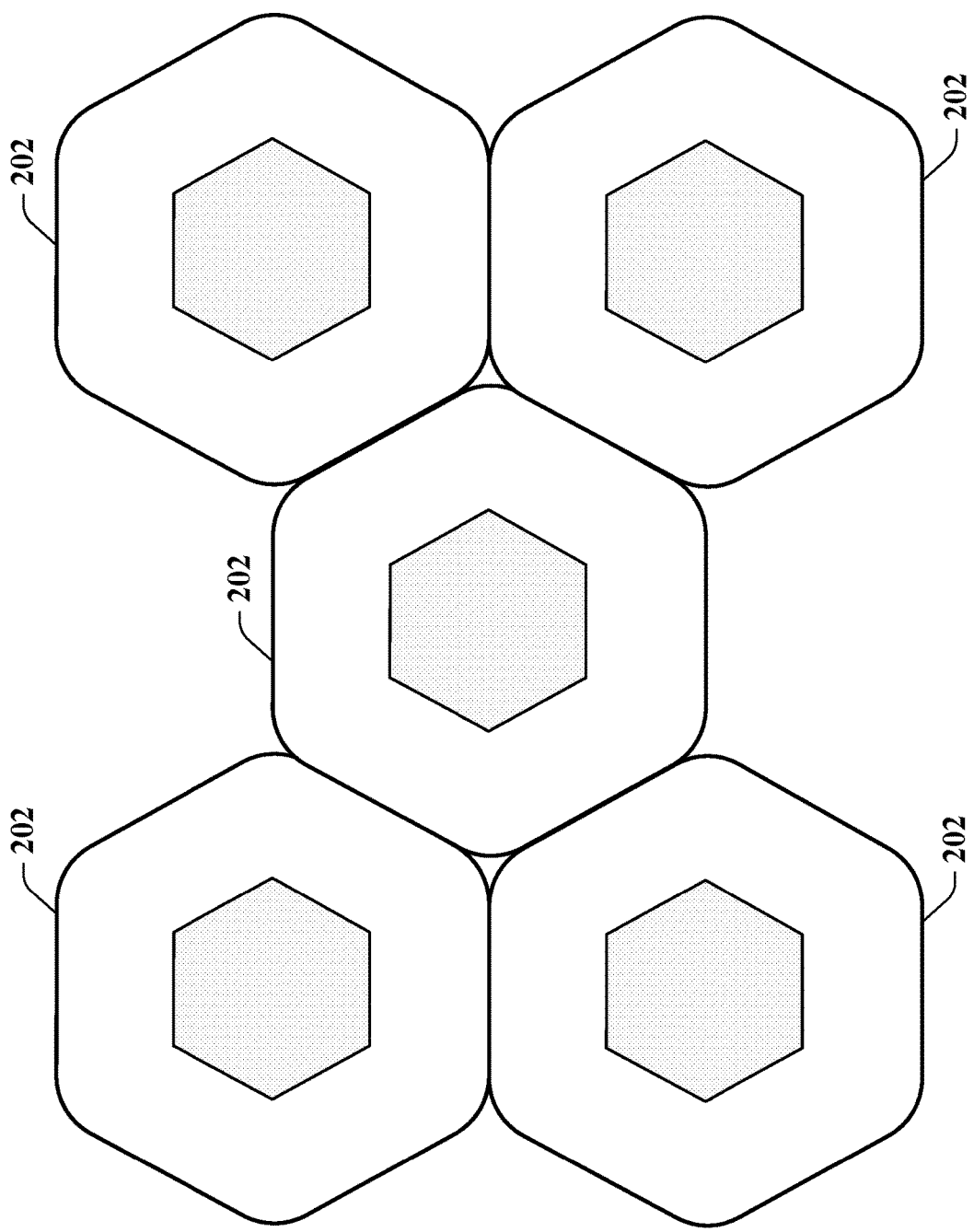
FIG. 2 illustrates an example of an arrangement of charging cells provided on a single layer of a segment of a charging surface provided by a wireless charging device in accordance with certain aspects disclosed herein.

FIG. 2 illustrates an example of an arrangement 200 of charging cells 202 provided on a single layer of a segment of a charging surface of a charging device that may be adapted in accordance with certain aspects disclosed herein. The charging cells 202 are arranged according to a honeycomb packaging configuration. In this example, the charging cells 202 are arranged end-to-end without overlap. This arrangement can be provided without through-hole or wire interconnects. Other arrangements are possible, including arrangements in which some portion of the charging cells 202 overlap. For example, wires of two or more coils may be interleaved to some extent.

Figure 3:
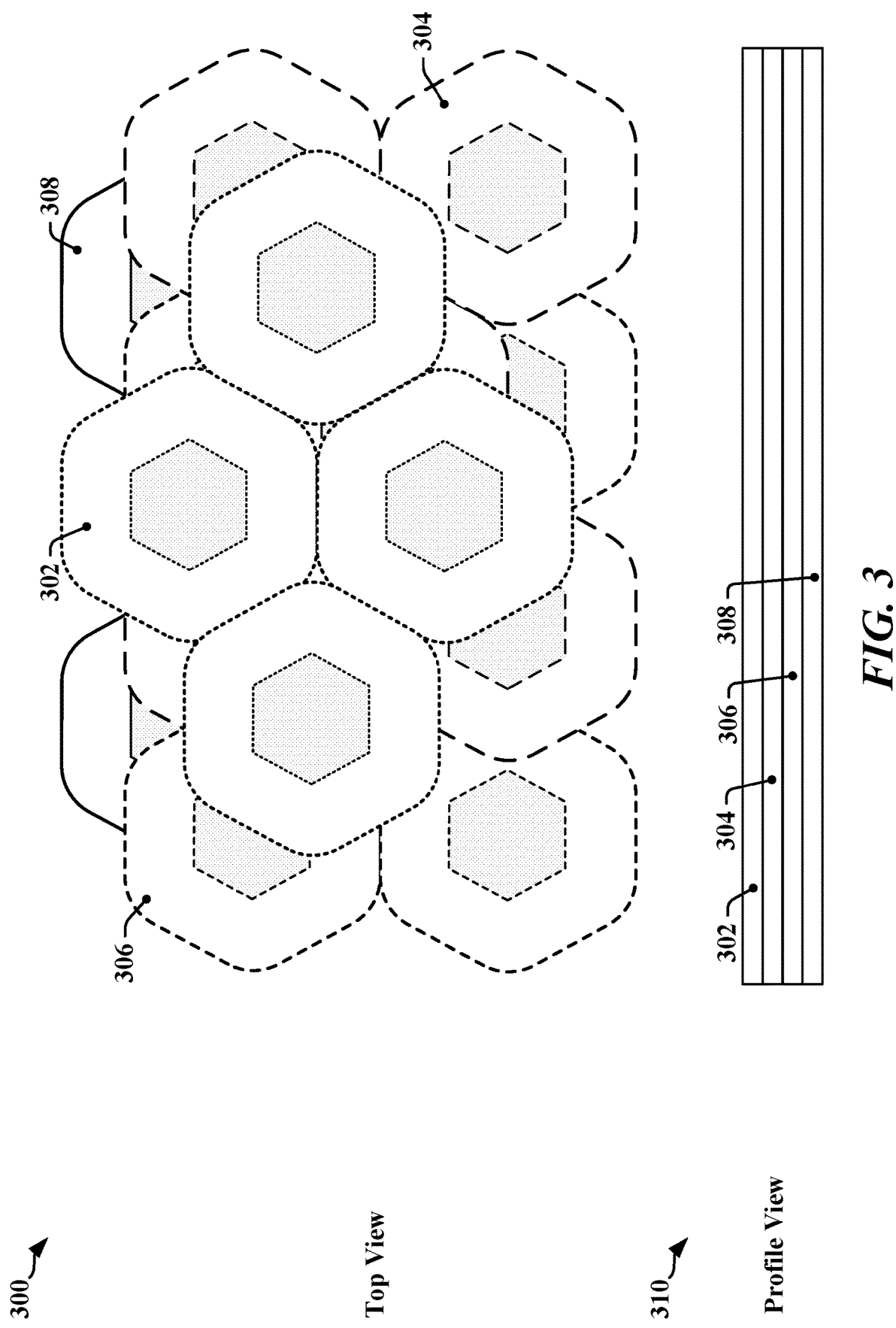
FIG. 3 illustrates an example of an arrangement of charging cells when multiple layers of charging cells are overlaid within a segment of a charging surface provided by a wireless charging device in accordance with certain aspects disclosed herein.

FIG. 3 illustrates an example of an arrangement of charging cells from two perspectives 300, 310 when multiple layers are overlaid within a segment of a charging surface that may be adapted in accordance with certain aspects disclosed herein. Layers of charging cells 302, 304, 306, 308 are provided within a segment of a charging surface. The charging cells within each layer of charging cells 302, 304, 306, 308 are arranged according to a honeycomb packaging configuration. In one example, the layers of charging cells 302, 304, 306, 308 may be formed on a printed circuit board that has four or more layers. The arrangement of charging cells 100 can be selected to provide complete coverage of a designated charging area that is adjacent to the illustrated segment.

Figure 4:
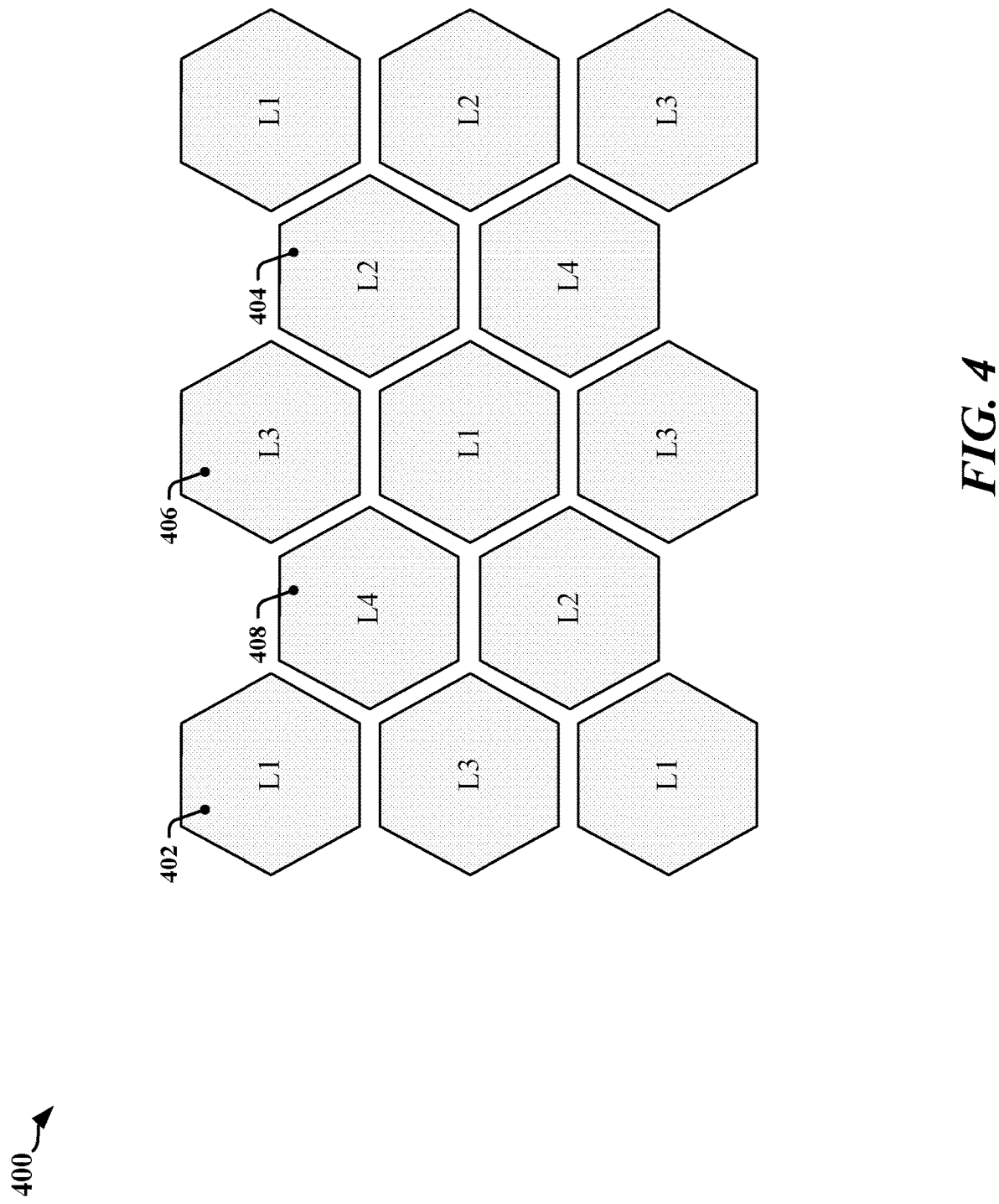
FIG. 4 illustrates the arrangement of power transfer areas provided by a charging surface of a charging device that employs multiple layers of charging cells configured in accordance with certain aspects disclosed herein.

FIG. 4 illustrates the arrangement of power transfer areas provided in a charging surface 400 that employs multiple layers of charging cells configured in accordance with certain aspects disclosed herein. The illustrated charging surface is constructed from four layers of charging cells 402, 404, 406, 408. In FIG. 4, each power transfer area provided by a charging cell in the first layer of charging cells 402 is marked "L1", each power transfer area provided by a charging cell in the second layer of charging cells 404 is marked "L2", each power transfer area provided by a charging cell in the third layer of charging cells 406 is marked "L3", and each power transfer area provided by a charging cell in the fourth layer of charging cells 408 is marked "L4".

Wireless Transmitter

Figure 5:
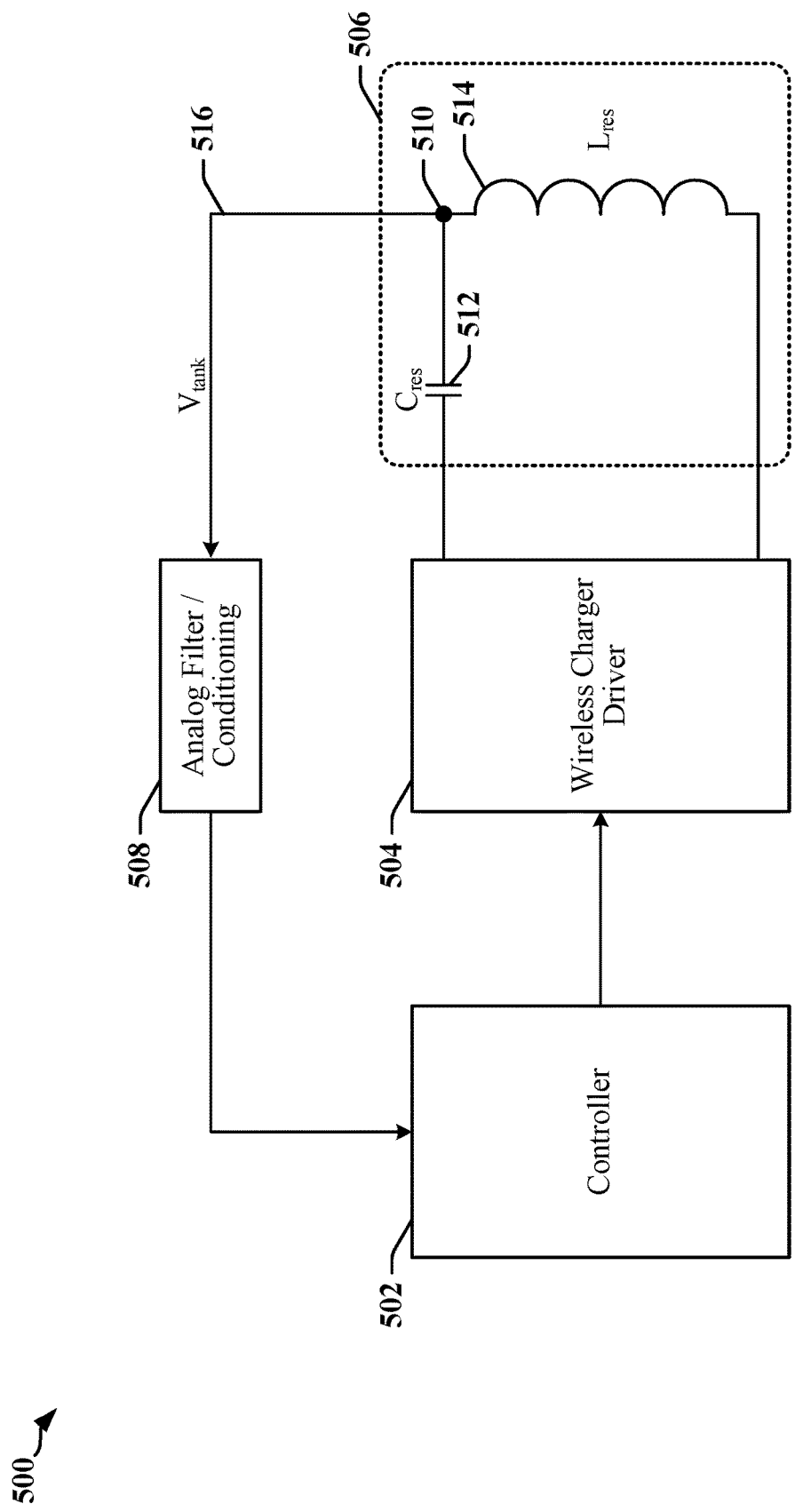
FIG. 5 illustrates a wireless transmitter that may be provided in a charger base station in accordance with certain aspects disclosed herein.

FIG. 5 illustrates a wireless transmitter 500 that may be provided in a charger base station. A controller 502 may receive a feedback signal filtered or otherwise processed by a conditioning circuit 508. The controller may control the operation of a driver circuit 504 that provides an alternating current to a resonant circuit 506 that includes a capacitor 512 and inductor 514. The resonant circuit 506 may also be referred to herein as a tank circuit, LC tank circuit, or LC tank, and the voltage 516 measured at an LC node 510 of the resonant circuit 506 may be referred to as the tank voltage.

The wireless transmitter 500 may be used by a charging device to determine if a compatible device has been placed on a charging surface during a discovery procedure. For example, the charging device may determine that a compatible device has been placed on the charging surface by sending an intermittent test signal (active ping) through the wireless transmitter 500, where the resonant circuit 506 may detect or receive encoded signals when a compatible device responds to the test signal. The charging device may be configured to activate one or more coils in at least one charging cell after receiving a response signal defined by standard, convention, manufacturer or application. In some examples, the compatible device can respond to a ping by communicating received signal strength such that the charging device can find an optimal charging cell to be used for charging the compatible device. The discovery procedure may enable the charging device to determine a charging configuration to be used for charging the discovered device. The charging configuration may define one or more transmitting coils or charging cells that will receive a charging current when charging a discovered device, a level of the power to be transmitted to the discovered device, maximum and minimum levels of power to be transmitted to the discovered device.

Passive ping techniques may use the voltage and/or current measured or observed at the LC node 510 to identify the presence of a receiving coil in proximity to the charging pad of a device adapted in accordance with certain aspects disclosed herein. In many conventional wireless charger transmitters, circuits are provided to measure voltage at the LC node 510 or to measure the current in the LC network. These voltages and currents may be monitored for power regulation purposes or to support communication between devices. In the example illustrated in FIG. 5, voltage at the LC node 510 is monitored, although it is contemplated that current may additionally or alternatively be monitored to support passive ping in which a short pulse is provided to the resonant circuit 506. A response of the resonant circuit 506 to a passive ping (initial voltage Vo) may be represented by the voltage ($V_{LC}$) at the LC node 510, such that:

$$V_{LC} = V_0 e^{-\left(\frac{\omega}{2Q}\right)t}. \quad \text{(Eq. 1)}$$

According to certain aspects disclosed herein, coils in one or more charging cells may be selectively activated to provide an optimal electromagnetic field for charging a compatible device. In some instances, coils may be assigned to charging cells, and some charging cells may overlap other charging cells. In the latter instances, an optimal charging configuration may be selected at the charging cell level. In other instances, charging cells may be defined based on placement of a device to be charged on a surface of the charging device. In these other instances, the combination of coils activated for each charging event can vary. In some implementations, a charging device may include a driver circuit that can select one or more cells and/or one or more predefined charging cells for activation during a charging event.

The charging device may define a charging configuration based in part on information received from the device to be charged. The device to be charged may communicate its identity and requested power transfer level by modulating current received through power transfer from the charging device. The device to be charged may modulate the received current by changing the load it presents to a receiving coil. Changes in load are reflected through the electromagnetic coupling to the charging device which may capture modulation signals by measuring tank voltage or current flowing through a transmitting coil. In one example, information may be encoded in the tank voltage using Amplitude Shift Key (ASK) modulation.

Figure 6:
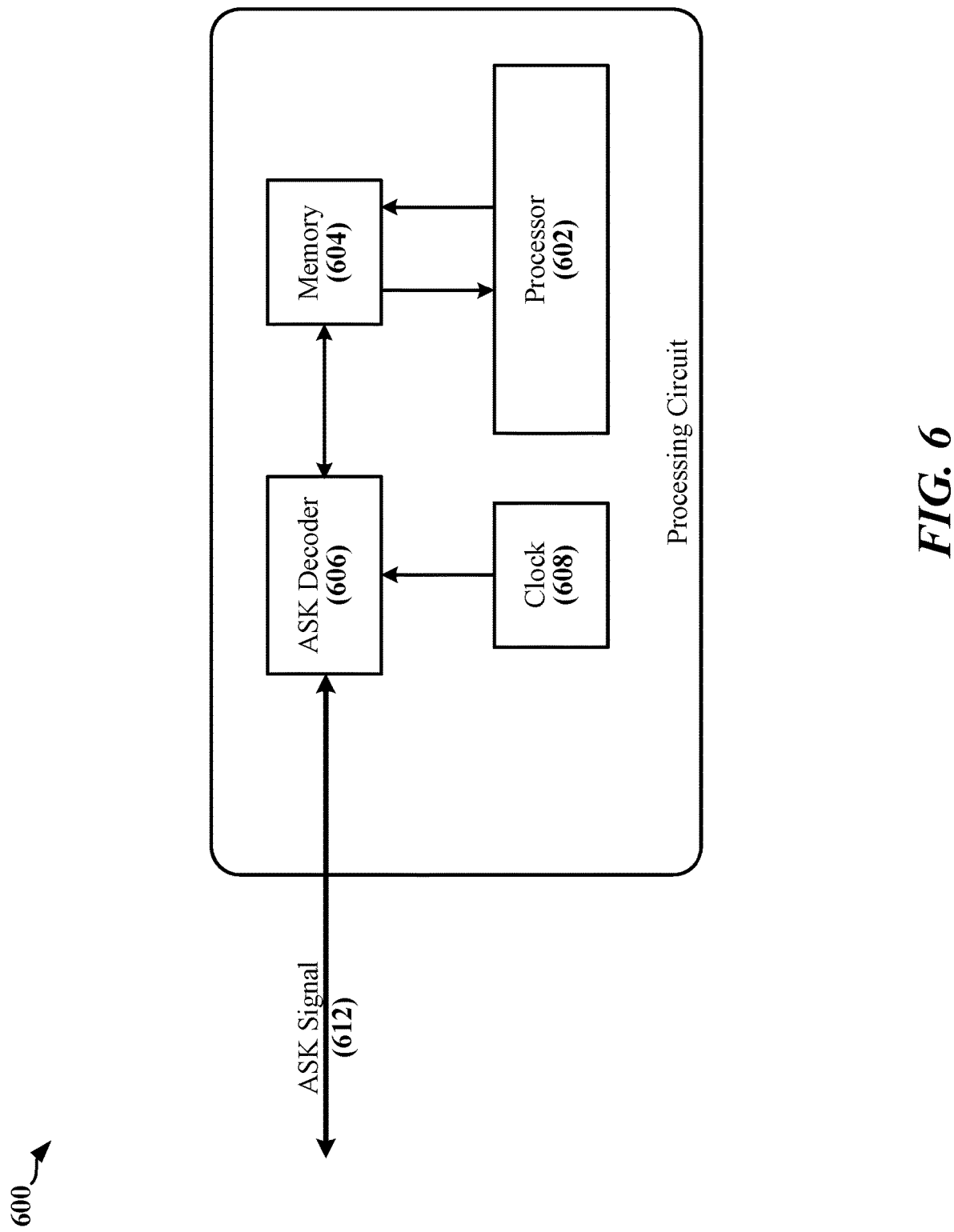
FIG. 6 illustrates a microcontroller that supports ASK demodulation in accordance with certain aspects disclosed herein.

FIG. 6 illustrates an example of a processing circuit 600 that may be configured to receive and decode ASK-modulated signal. The processing circuit 600 includes a processor 602, which may be coupled to a memory device 604 and/or registers that can store messages to be transmitted using an ASK-modulated signal 612 and/or messages decoded from a received ASK-modulated signal 612. The processing circuit 600 includes an ASK decoder 606 that may be implemented using hardware, software or some combination of hardware and software. The ASK decoder 606 may use a clock signal received from a clock generation or recovery circuit to control timing of the transmitted ASK-modulated signal 612 and to control sampling and decoding of a received ASK-modulated signal 612.

Figure 7:
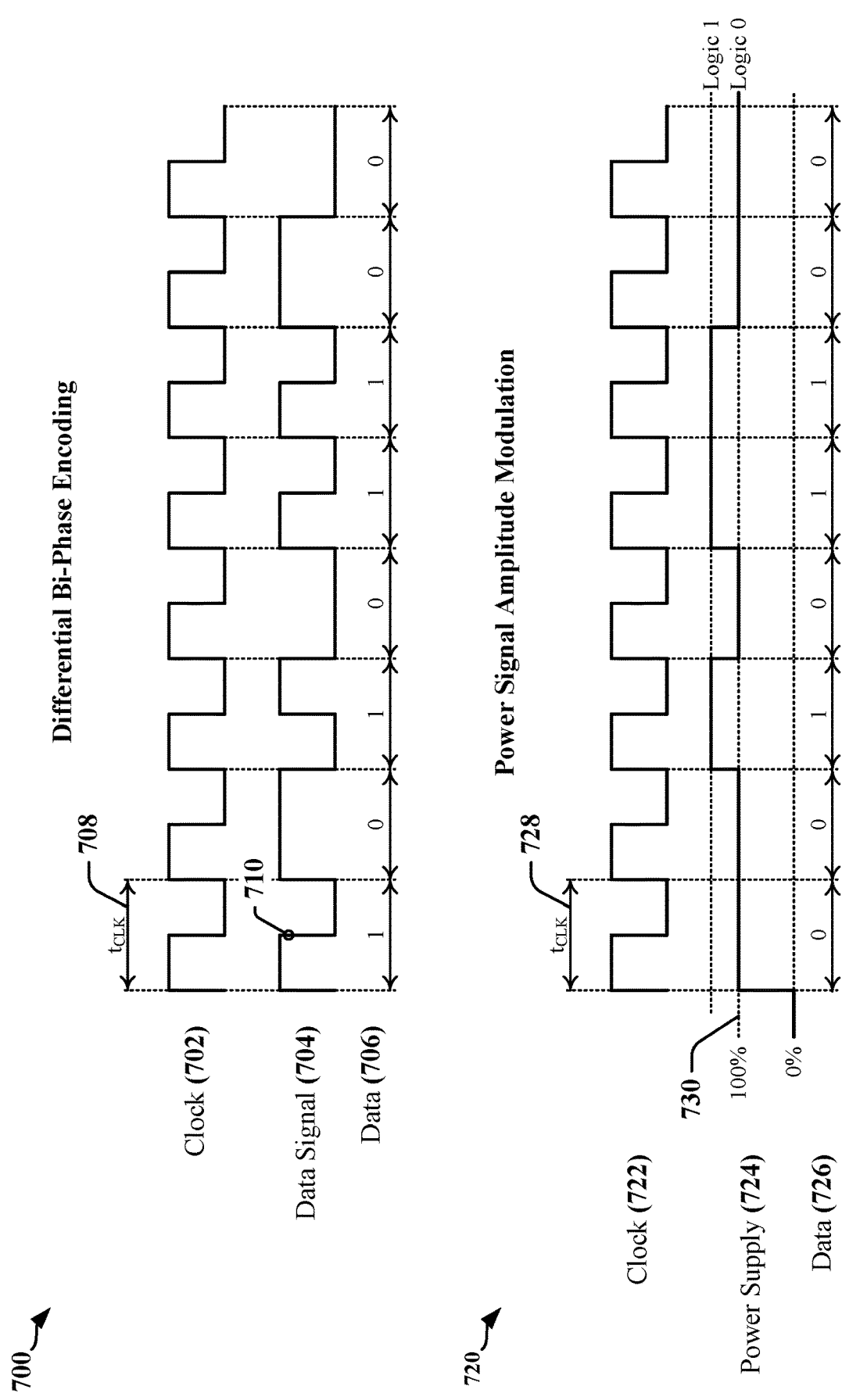
FIG. 7 illustrates examples of encoding schemes that may be adapted to digitally encode messages exchanged between power receivers and power transmitters in accordance with certain aspects disclosed herein.

FIG. 7 illustrates examples of encoding schemes 700, 720 that may be adapted to digitally encode messages exchanged between power receivers and power transmitters. In the first example, a differential bi-phase encoding scheme 700 encodes binary bits in the phase of a data signal 704. In the illustrated example, each bit of a data byte 706 is encoded in a corresponding cycle 708 of an encoder clock signal 702. The value of each bit is encoded in the presence or absence of a transition 710 (phase change) in the data signal 704 during the corresponding cycle 708.

In the second example, a power supply 724 is encoded using a power signal amplitude encoding scheme 720. In the illustrated example, binary bits of a data byte 726 are encoded in level of the power supply 724. Each bit of the data byte 726 is encoded in a corresponding cycle 728 of an encoder clock signal 722. The value of each bit is encoded in the voltage level of the power supply 724 relative to a nominal 100% voltage level 730 of the power supply 724 during the corresponding cycle 708.

Selectively Activating Coils

According to certain aspects disclosed herein, transmitting coils in one or more charging cells may be selectively activated to provide an optimal electromagnetic field for charging a compatible device. In some instances, transmitting coils may be assigned to charging cells, and some charging cells may overlap other charging cells. In the latter instances, the optimal charging configuration may be selected at the charging cell level. In other instances, charging cells may be defined based on placement of a device to be charged on a surface of the charging device. In these other instances, the combination of coils activated for each charging event can vary. In some implementations, a charging device may include a driver circuit that can select one or more cells and/or one or more predefined charging cells for activation during a charging event.

Figure 8:
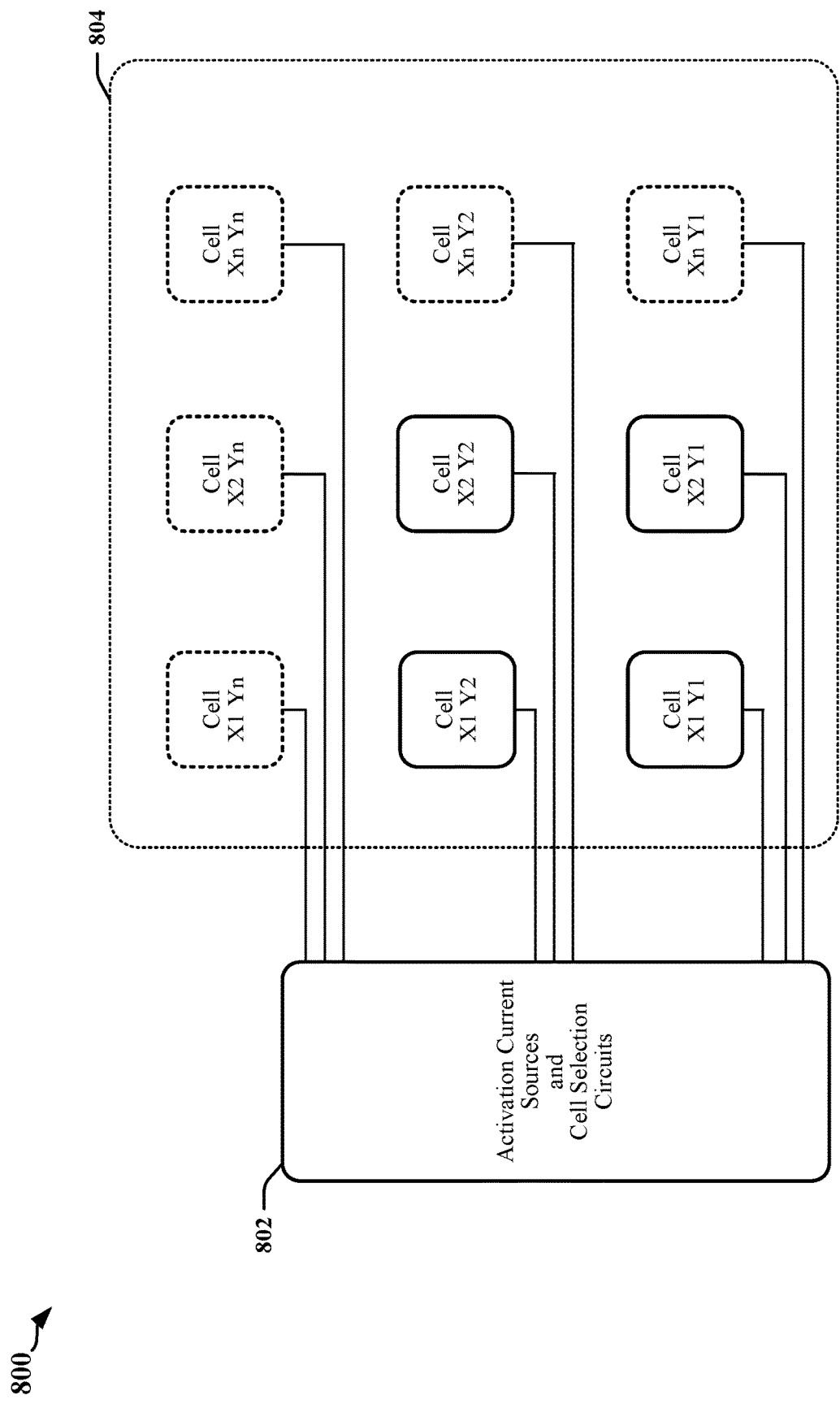
FIG. 8 illustrates a topology that supports direct drive of transmitting coils in a wireless charger adapted in accordance with certain aspects disclosed herein.

FIG. 8 illustrates an example of a topology 800 in which each coil or charging cell is individually and/or directly driven by a driver circuit 802 in accordance with certain aspects disclosed herein. The driver circuit 802 may be configured to select one or more coils or charging cells 100 from a group of coils 804 to charge a receiving device. It will be appreciated that the concepts disclosed here in relation to charging cells 100 may be applied to selective activation of individual coils or stacks of coils. Charging cells 100 that are not in use receive no current flow. A relatively large number of charging cells 100 may be in use and a switching matrix may be employed to drive individual coils or groups of coils. In one example, a first switching matrix may configure connections that define a charging cell or a group of coils to be used during a charging event and a second switching matrix may be used to activate the charging cell and/or a group of selected coils.

In some implementations, a matrix switching scheme may be employed to select the charging cells 100 from the group of coils 804 to charge a receiving device. A relatively large number of charging cells 100 may be used in the honeycomb packaging configuration illustrated in FIGS. 2 and 3, and at least some of the charging cells 100 may be logically arranged or connected in a switching matrix. The use of a switching matrix can significantly reduce the number of switching components needed to operate a network of tuned LC circuits. For example, N individually connected cells require at least N switches, whereas a two-dimensional matrix having N cells can be operated with √N switches. In one example, a 9-cell implementation can be implemented in a 3×3 matrix using 6 switches, saving 3 switches. In another example, a 16-cell implementation can be implemented in a 4×4 matrix using 8 switches, saving 8 switches. During operation at least 2 switches are closed to actively couple one coil to a wireless transmitter and/or receiver circuit. Multiple switches can be closed at once in order to facilitate connection of multiple coils to the wireless transmitter and/or receiver circuit. Multiple switches may be closed, for example, to enable modes of operation that drive multiple transmitting coils when transferring power to a receiving device.

Thermal Regulation in a Multi-Device, Multi-Coil Wireless Charger

Batteries used in mobile communication devices may be susceptible to heating issues under high current draw or current high current charging operations. A battery installed in a device may be susceptible to overheating when the device has limited heatsinking or heat dissipation capabilities. For example, a battery in a mobile communication device may be located within a small space that closely matches the volume of the battery such that airflow is restricted. Restricted airflow can inhibit the dissipation of heat generated through losses incurred during battery charging and discharging, resulting in heat buildup near the battery and within the mobile communication device as a whole. Control of heat generation, buildup and dissipation is needed to prevent damage to batteries and to avoid potential runaway chemical reactions that can result in detonation or combustion of constituents of the battery. Certain industry bodies define and promulgate standards and protocols for managing battery operation in a manner that protects batteries from overheating. For example, the Japan Electronics and Information Technology Industries Association (JEITA) defines operating limits for Lithium-Ion batteries. Lithium-Ion batteries are widely used in portable electronic equipment due in part to their high-energy density, and JEITA guidelines and procedures are intended to prevent ignition of Lithium Ion batteries.

JEITA defines operating conditions that affect Lithium-Ion batteries operated at elevated temperatures. In one example, a pulsed current charging technique is used to improve the lifetime, charging speed, charge capacity, discharging capability and temperature control of Lithium-Ion batteries. JEITA defines a duty cycle that can range between 20% and 80%.

Certain aspects of this disclosure provide techniques, circuits and methods for monitoring, limiting and/or controlling overtemperature events in chargeable devices during battery charging, including when the charging device is a multi-device, multi-coil wireless charger. Limitation and amelioration of overtemperature events through modifications to the charging configuration defined for or by the wireless charger can avoid the imposition of inefficient charging duty cycles when operating a chargeable device in accordance with JEITA protocols.

The wireless charger is typically unaware of the temperature or state of charge of a battery in a device being charged. The device being charged may monitor battery temperature and may respond to temperature issues by requesting lower charging power or by terminating charging until cooling has been accomplished. Requests for lower charging power or termination of charging by the device being charged can be made for various reasons other than temperature-related reasons. For example, reductions in charging power may be requested when the battery in the device being charged is at full capacity or approaching full capacity. Accordingly, requests for changes in charging power are unreliable indicators for distinguishing between requests based on battery charge and temperature state when the charging device is unaware of state of charge of a battery in a device being charged.

In one aspect of this disclosure, temperature measured at the surface of a charging device (which may also be referred to as a "charging pad") may be used to determine the likely reason for requests for changes in charging power. In one example, a request for a reduction in charging power when the temperature at the surface of the charging device is nominal or within a preconfigured range may indicate that the battery in the device being charged is at full capacity or approaching full capacity. In another example, a request for a reduction in charging power when the temperature at the surface of the charging device exceeds nominal maximum temperature or falls outside a preconfigured range of temperatures may indicate that the battery in the device being charged is experiencing elevated temperatures.

Figure 9:
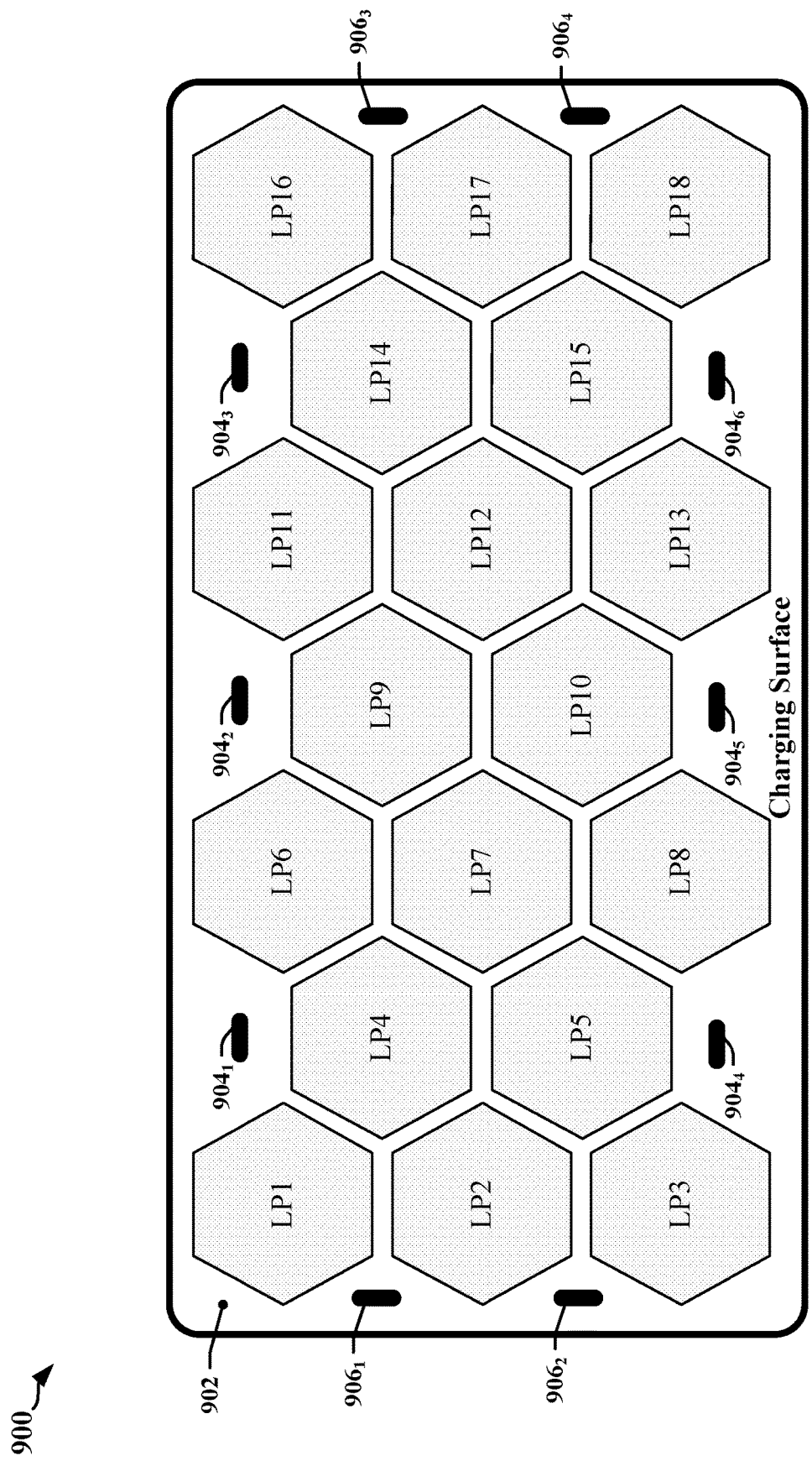
FIG. 9 provides a two-dimensional view showing temperature sensors provided on a surface of a wireless charging device in accordance with certain aspects of this disclosure.
Figure 10:
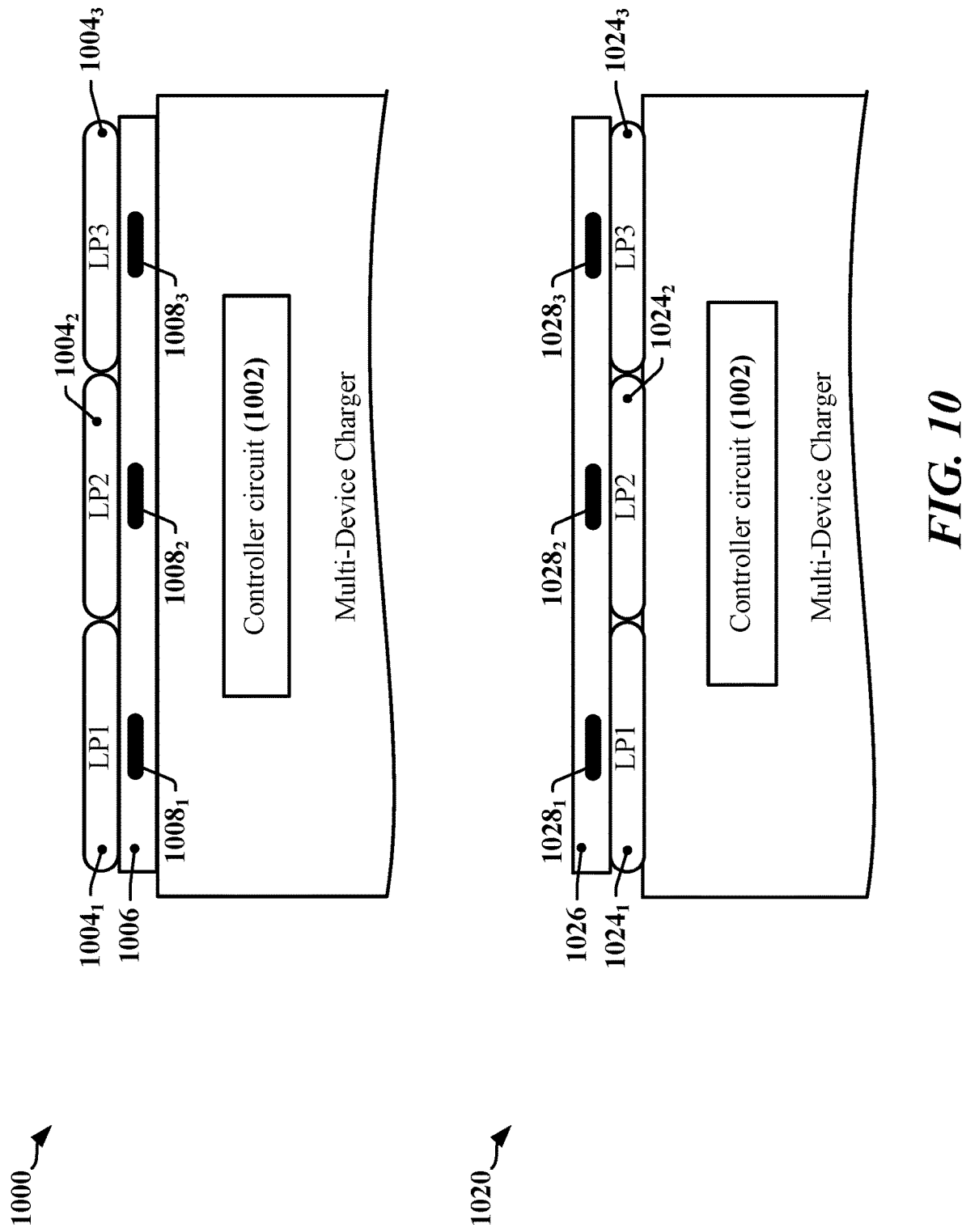
FIG. 10 provides cross-sectional views showing configurations of temperature sensors provided in accordance with certain aspects of this disclosure.

FIGS. 9 and 10 illustrate configurations 900, 1000, 1020 of multidevice wireless charging devices that may be instrumented to measure temperature in accordance with certain aspects of this disclosure. FIG. 9 provides a two-dimensional view of a configuration 900 of the wireless charging device in which temperature sensors $904_1$-$904_6$ and $906_1$-$906_4$ are deployed around the perimeter of an array of charging cells (LP1-LP18) provided on the surface 902 of the wireless charging device. A combination of horizontal temperature sensors $904_1$-$904_6$ and vertical temperature sensors $906_1$-$906_4$ may enable an estimated or calculated mapping of temperatures across the surface 902 of the wireless charging device. The temperature sensors $904_1$-$904_6$ and $906_1$-$906_4$ may include thermocouples or other thermometric devices.

In other examples, temperature sensors may be provided at the center of each charging cell, or between each pair of charging cells. FIG. 10 provides cross-sectional views of different configurations 1000, 1020 of temperature sensors $1008_1$-$1008_3$ and $1028_1$-$1028_3$ provided in vertical alignment with corresponding charging cells $1004_1$-$1004_3$. The temperature sensors $1008_1$-$1008_3$ and $1028_1$-$1028_3$ may include thermocouples or other thermometric devices. The temperature sensors $1008_1$-$1008_3$, $1028_1$-$1028_3$ may be embedded in, attached to, or otherwise provided in thermal communication with a thermally conductive layer 1006, 1026 located on or near the surface 902 of the wireless charging device.

The thermally conductive layer 1006, 1026 may further serve as electrical insulation or may provide, enhance or configure electromagnetic properties of the surface 902 of the wireless charging device. In the first configuration 1000, the thermally conductive layer 1006 is provided at or near the top of the surface 902 of the wireless charging device and below the charging cells $1004_1$-$1004_3$. In the second configuration 1020, the thermally conductive layer 1026 is provided in a layer above the charging cells $1004_1$-$1004_3$. In other configurations (not shown), temperature sensors may be provided in the same layer as the charging cells and located at the center of each charging cell or between charging cells. A wireless charging device may be configured to consider surface temperatures when determining whether requests for reduced power transfer indicate that a battery temperature issue has been detected by the device being charged.

In some implementations, the temperature sensors $904_1$-$904_6$, $906_1$-$906_4$, $1008_1$-$1008_3$ and $1028_1$-$1028_3$ may be calibrated using instrumented chargeable devices. In one example, an instrumented chargeable device is placed on the surface 902 of the wireless charging device over one or more charging cells $1004_1$-$1004_3$. Internal temperature measurements taken by the instrumented chargeable device and concurrent measurements of surface temperature captured by the temperature sensors $904_1$-$904_6$, $906_1$-$906_4$ or $1008_1$-$1008_3$ may be compared and correlated to provide information usable by a controller 1002 in the wireless charging device for estimating internal temperatures of chargeable devices during normal operation. In one example, the wireless charging device may be configured with a lookup table that can be indexed using surface temperatures of the wireless charging device to obtain estimates of internal temperatures of a device being charged during normal operation.

According to certain aspects of this disclosure, a wireless charging device may determine that a device being charged is attempting to cool down based on a combination of information that includes pad or surface temperature and requests for power draw. The wireless charging device may assist cooling by reducing charging power to a lowest level, while monitoring changes in temperature measured at the surface of the wireless charging device in order to estimate or infer that changes in temperature have occurred within the device being charged. The wireless charging device may terminate charging when temperature fails to decline at a sufficient rate. The wireless charging device may reduce or terminate charging for one or more other devices when temperature fails to decline at a sufficient rate after terminating charging for the device being cooled.

Figure 11:
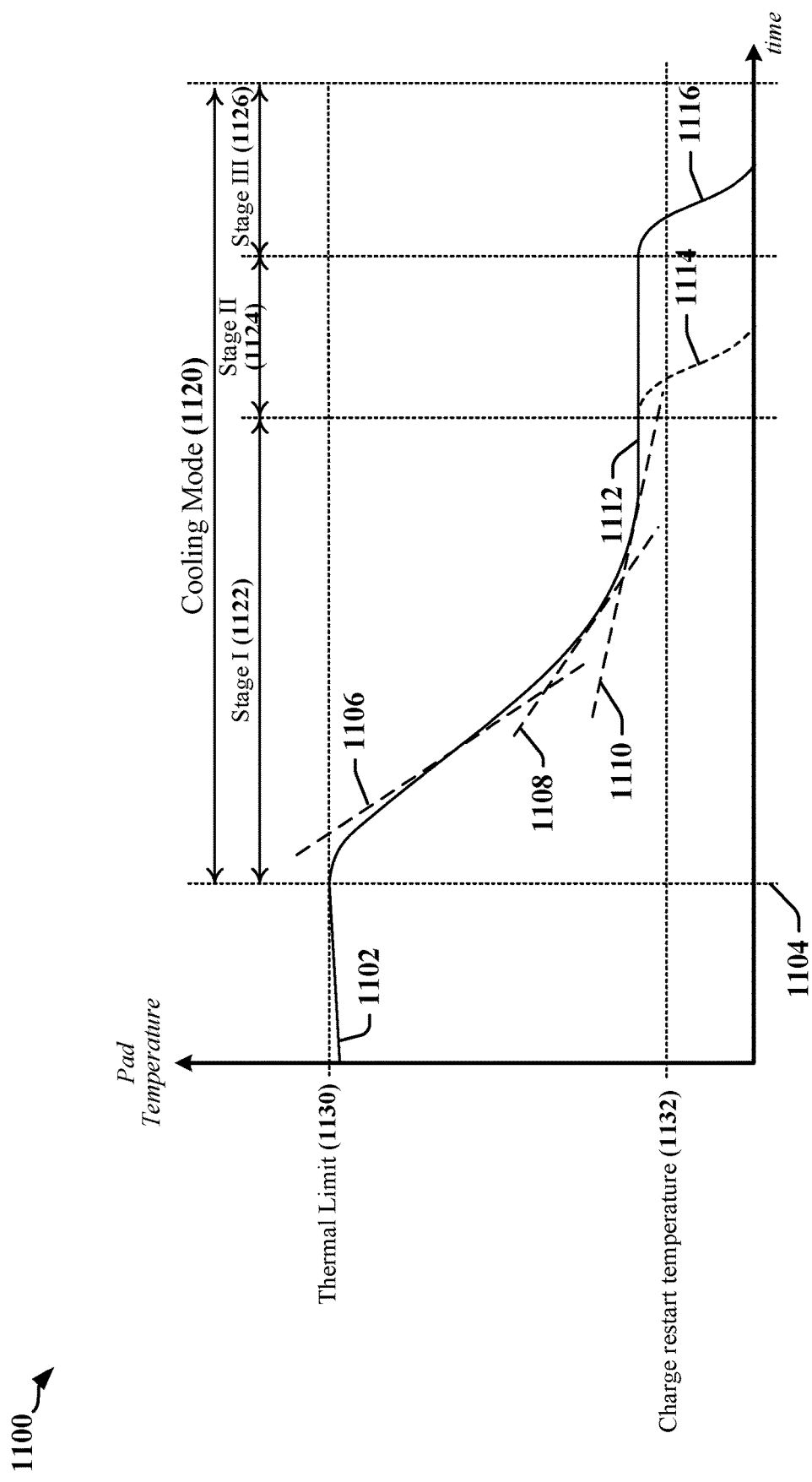
FIG. 11 illustrates a cooling process managed by a wireless charging device in accordance with certain aspects of this disclosure.

The graph 1100 in FIG. 11 illustrates a cooling process managed by a wireless charging device in accordance with certain aspects of this disclosure. The graph includes a curve that represents a battery temperature 1102 measured or estimated by the device being charged, which may have some correspondence or correlation to temperature measured at the surface of the wireless charging device. The wireless charging device may estimate internal temperature of a device being charged based on temperatures measured at the surface of the wireless charging device.

Initially, battery temperature 1102 is increasing until a high temperature limit 1130 is reached at a first point in time 1104. The high temperature limit 1130 may correspond to a maximum temperature defined for the battery of the device being charged. Protocols or industry standards may impose restrictions on charging power when the maximum temperature is reached. The device being charged may issue requests to modify transmitted power that result in lower power transfer rates. In one example, the device being charged may issue requests that are intended to cause power transfer to conform to a duty cycle defined by protocols or standards for charging high-temperature batteries. The limitations imposed on charging through duty cycles may result in inefficiencies in charging and temperature reduction.

In one aspect, the wireless charging device may associate requests to modify transmitted power with an overtemperature event when temperatures measured at the surface of the wireless charging device exceed a threshold temperature level that indicates that the battery temperature 1102 of the device being charged has reached the high temperature limit 1130 or is within range of the high temperature limit 1130. The wireless charging device may enter a cooling mode 1120 when an overtemperature event is determined to have occurred. The cooling mode 1120 may persist until the measured or estimated battery temperature 1102 has reached a low temperature threshold 1132. Multiple phases or stages may be defined for the cooling mode 1120.

A first stage 1122 of the cooling mode 1120 commences after the thermal limit is triggered or after the high temperature limit 1130 is reached. In the first stage 1122, the wireless charging device may reduce transmitted power to the lowest level that does not trigger or cause disconnection from the device being charged. The lowest level of transmitted power may be associated with the lowest level of dissipated power for the device being charged and a drop in measured or estimated battery temperature 1102 may be expected. A limited duration may be defined for the cooling mode 1120, and the battery temperature 1102 may be expected to drop to the level of the low temperature threshold 1132 within the duration of the cooling mode 1120. The thermal gradient of the battery temperature 1102 may be monitored to determine whether battery temperature 1102 is likely to fall below the low temperature threshold 1132 during the cooling mode 1120. In the illustrated example, the rate of change of the battery temperature 1102 varies and may be characterized by multiple temperature gradients 1106, 1108, 1110. Temperature gradients 1106, 1108, 1110 may be calculated based on a difference in measured or estimated battery temperature 1102 over a period of time defined by a specified timer interval.

An initial temperature gradient 1106 is consistent with a likelihood that the battery temperature 1102 will reach the low temperature threshold 1132 while the cooling mode 1120 is in effect. The rate of change of the battery temperature 1102 decreases, as indicated by the two later occurring temperature gradients 1108 and 1110 and a levelling to a zero gradient 1112. Accordingly, in the illustrated example, it is apparent that the measured or estimated battery temperature 1102 will not reach the low temperature threshold 1132 while the cooling mode 1120 is in effect. In this example, the first stage 1122 is terminated and a second stage 1124 is initiated.

In the second stage 1124, the wireless charging device terminates power transmission to the device being charged. The absence of transmitted power eliminates energy dissipation arising from charging and a drop 1114 in battery temperature 1102 is expected in the absence of other sources of heating. The thermal gradient of the battery temperature 1102 may be monitored to determine whether battery temperature 1102 is likely to fall below the low temperature threshold 1132 during the cooling mode 1120 within a preconfigured maximum cool down duration. The preconfigured maximum cool down duration may be defined by standards, protocol or based on information identifying the type or capabilities of the device being charged. The preconfigured maximum cool down duration may be specified by the charging configuration defined for the device being charged. In the illustrated example, the rate of change of the battery temperature 1102 remains constant or has a gradient that indicates that the battery temperature 1102 is unlikely to drop below the low temperature threshold 1132. Here the second stage 1124 is terminated and a third stage 1126 is initiated.

In the third stage 1124, power levels transmitted by the wireless charging device to one or more adjacent devices are reduced or terminated. In the third stage 1126, cooling is enforced across multiple devices and temperatures measured at charging cells involved in the charging of the adjacent devices may also be monitored. In some implementations, a thermal cutoff or limit can be applied globally across the surface 902 of the wireless charging device to cause all devices to be cooled, thereby cooling the charging system including the wireless charging device and all devices placed on the surface 902 of the wireless charging device. The thermal gradient of the battery temperature 1102 may be monitored to determine whether the battery temperature 1102 is likely to fall below the low temperature threshold 1132 during the cooling mode 1120. In the illustrated example, a drop 1116 in the battery temperature 1102 occurs.

Figure 12:
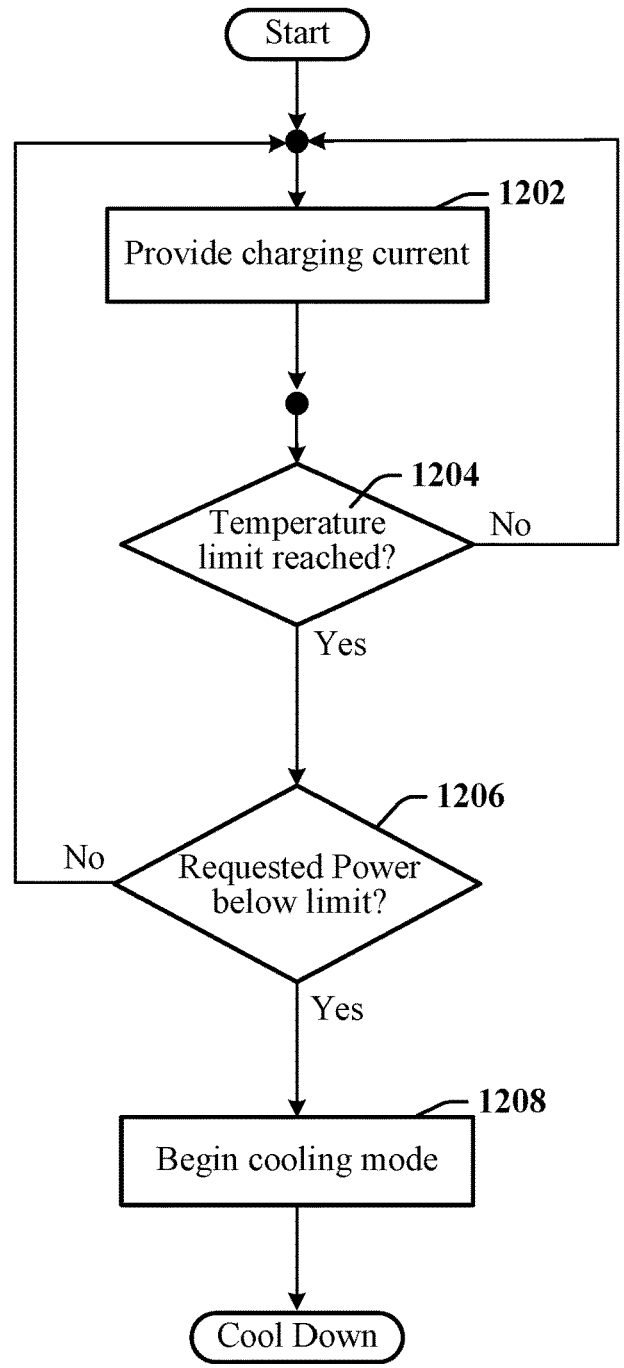
FIG. 12 illustrates a first example of a method for managing thermal cooling in a device being charged by a multi-coil wireless charging system in accordance with certain aspects of this disclosure.

FIG. 12 is a flowchart 1200 that illustrates a first example of a method for managing thermal cooling in a device being charged by a multi-coil wireless charging system. The method be performed by a controller 1002 in the multi-coil wireless charging system. The multi-coil wireless charging system may be capable of charging multiple chargeable devices concurrently. At block 1202, the controller 1002 may detect the presence of a receiving device that has been placed on or near the surface 902 of the multi-coil wireless charging system. The controller 1002 may interrogate and/or negotiate with the receiving device to generate a charging configuration. The controller 1002 may then cause a charging current to be provided to one or more transmitting coils of the multi-coil wireless charging system in accordance with the charging configuration.

At block 1204, the controller 1002 may determine whether a temperature limit has been reached in the receiving device. The temperature limit may be related to the temperature of a battery being charged in the receiving device. The temperature limit may be determined to have been reached based on a temperature measured at the surface of the multi-coil wireless charging system. When the controller 1002 determines that the temperature limit has not been reached, the charging continues at block 1202. When the controller 1002 determines that the temperature limit has been reached, the controller 1002 may interpret requests for power reductions from the receiving device as an indication that the receiving device is attempting to reduce its temperature, and the controller 1002 may proceed to block 1206.

In one example, the controller 1002 may determine at block 1206 whether the requested power level is below a minimum power level defined by the charging configuration, protocol or system configuration. When the requested power level exceeds or equals the minimum power level, charging may continue at block 1202 at the requested, reduced power level. When the requested power level is less than the minimum power level, the controller 1002 may determine that the receiving device is attempting to cool down and may enter a cooling mode at block 1208. The receiving device may have requested less than minimum power level to implement a duty cycle defined by protocols.

In some instances, the controller 1002 may respond to requests for changes in transmitted power when the temperature limit has not been reached. and one or more requests related to charging power levels received from the receiving device.

Example of a Processing Circuit

Figure 13:
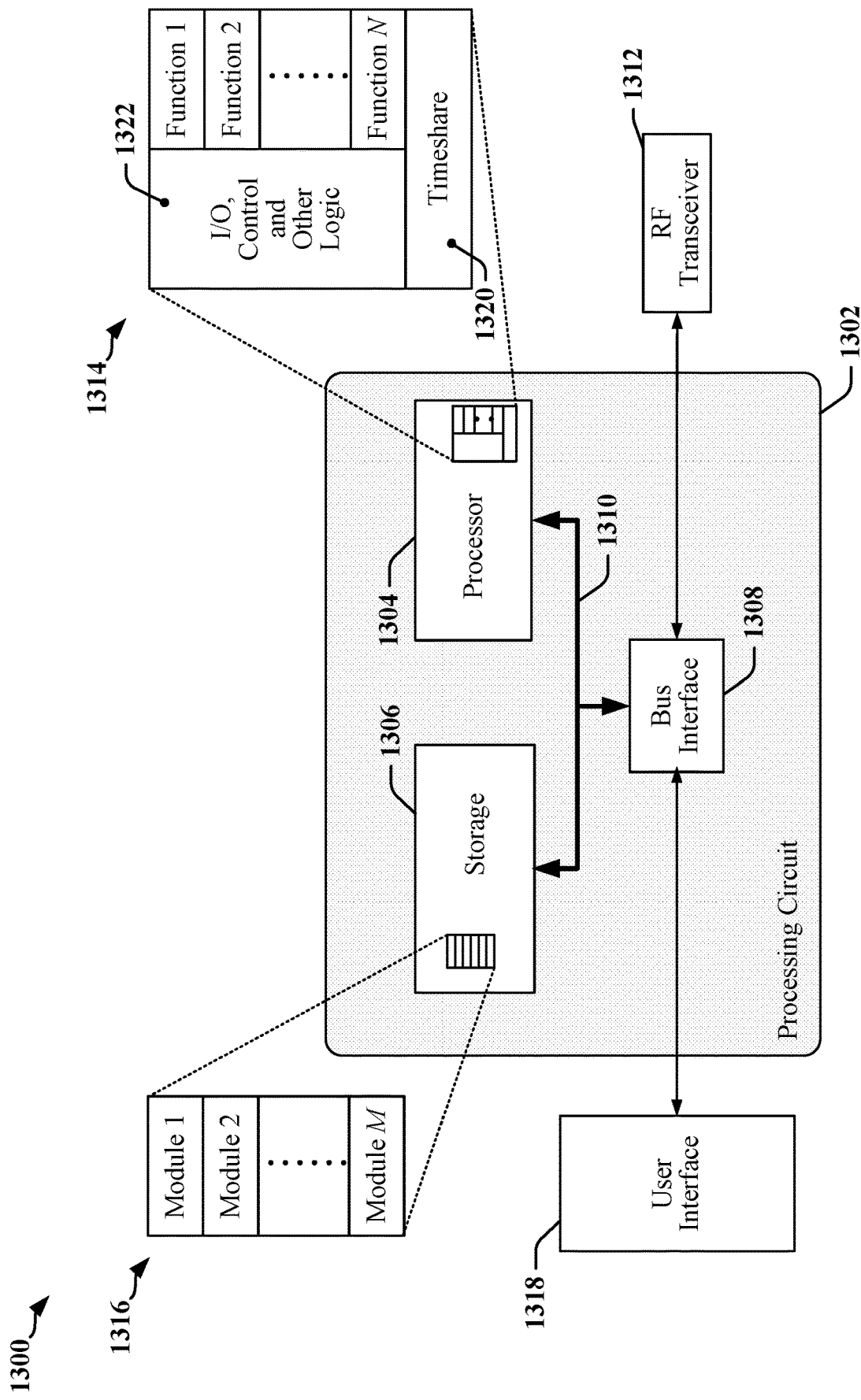
FIG. 13 illustrates one example of an apparatus employing a processing circuit that may be adapted according to certain aspects disclosed herein.

FIG. 13 illustrates an example of a hardware implementation for an apparatus 1300 that may be incorporated in a charging device or in a receiving device that enables a battery to be wirelessly charged. In some examples, the apparatus 1300 may perform one or more functions disclosed herein. In accordance with various aspects of the disclosure, an element, or any portion of an element, or any combination of elements as disclosed herein may be implemented using a processing circuit 1302. The processing circuit 1302 may include one or more processors 1304 that are controlled by some combination of hardware and software modules. Examples of processors 1304 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1304 may include specialized processors that perform specific functions, and that may be configured, augmented or controlled by one of the software modules 1316. The one or more processors 1304 may be configured through a combination of software modules 1316 loaded during initialization, and further configured by loading or unloading one or more software modules 1316 during operation.

In the illustrated example, the processing circuit 1302 may be implemented with a bus architecture, represented generally by the bus 1310. The bus 1310 may include any number of interconnecting buses and bridges depending on the specific application of the processing circuit 1302 and the overall design constraints. The bus 1310 links together various circuits including the one or more processors 1304, and storage 1306. Storage 1306 may include memory devices and mass storage devices, and may be referred to herein as computer-readable media and/or processor-readable media. The storage 1306 may include transitory storage media and/or non-transitory storage media.

The bus 1310 may also link various other circuits such as timing sources, timers, peripherals, voltage regulators, and power management circuits. A bus interface 1308 may provide an interface between the bus 1310 and one or more transceivers 1312. In one example, a transceiver 1312 may be provided to enable the apparatus 1300 to communicate with a charging or receiving device in accordance with a standards-defined protocol. Depending upon the nature of the apparatus 1300, a user interface 1318 (e.g., keypad, display, speaker, microphone, joystick) may also be provided, and may be communicatively coupled to the bus 1310 directly or through the bus interface 1308.

A processor 1304 may be responsible for managing the bus 1310 and for general processing that may include the execution of software stored in a computer-readable medium that may include the storage 1306. In this respect, the processing circuit 1302, including the processor 1304, may be used to implement any of the methods, functions and techniques disclosed herein. The storage 1306 may be used for storing data that is manipulated by the processor 1304 when executing software, and the software may be configured to implement any one of the methods disclosed herein.

One or more processors 1304 in the processing circuit 1302 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1306 or in an external computer-readable medium. The external computer-readable medium and/or storage 1306 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1306 may also include, by way of example, a carrier wave, a transmission line, and any other suitable medium for transmitting software and/or instructions that may be accessed and read by a computer. Computer-readable medium and/or the storage 1306 may reside in the processing circuit 1302, in the processor 1304, external to the processing circuit 1302, or be distributed across multiple entities including the processing circuit 1302. The computer-readable medium and/or storage 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1306 may maintain and/or organize software in loadable code segments, modules, applications, programs, etc., which may be referred to herein as software modules 1316. Each of the software modules 1316 may include instructions and data that, when installed or loaded on the processing circuit 1302 and executed by the one or more processors 1304, contribute to a run-time image 1314 that controls the operation of the one or more processors 1304. When executed, certain instructions may cause the processing circuit 1302 to perform functions in accordance with certain methods, algorithms and processes described herein.

Some of the software modules 1316 may be loaded during initialization of the processing circuit 1302, and these software modules 1316 may configure the processing circuit 1302 to enable performance of the various functions disclosed herein. For example, some software modules 1316 may configure internal devices and/or logic circuits 1322 of the processor 1304, and may manage access to external devices such as a transceiver 1312, the bus interface 1308, the user interface 1318, timers, mathematical coprocessors, and so on. The software modules 1316 may include a control program and/or an operating system that interacts with interrupt handlers and device drivers, and that controls access to various resources provided by the processing circuit 1302. The resources may include memory, processing time, access to a transceiver 1312, the user interface 1318, and so on.

One or more processors 1304 of the processing circuit 1302 may be multifunctional, whereby some of the software modules 1316 are loaded and configured to perform different functions or different instances of the same function. The one or more processors 1304 may additionally be adapted to manage background tasks initiated in response to inputs from the user interface 1318, the transceiver 1312, and device drivers, for example. To support the performance of multiple functions, the one or more processors 1304 may be configured to provide a multitasking environment, whereby each of a plurality of functions is implemented as a set of tasks serviced by the one or more processors 1304 as needed or desired. In one example, the multitasking environment may be implemented using a timesharing program 1320 that passes control of a processor 1304 between different tasks, whereby each task returns control of the one or more processors 1304 to the timesharing program 1320 upon completion of any outstanding operations and/or in response to an input such as an interrupt. When a task has control of the one or more processors 1304, the processing circuit is effectively specialized for the purposes addressed by the function associated with the controlling task. The timesharing program 1320 may include an operating system, a main loop that transfers control on a round-robin basis, a function that allocates control of the one or more processors 1304 in accordance with a prioritization of the functions, and/or an interrupt driven main loop that responds to external events by providing control of the one or more processors 1304 to a handling function.

In one implementation, the apparatus 1300 includes or operates as a wireless charging device that has a battery charging power source coupled to a charging circuit, a plurality of charging cells, one or more driver circuits (see FIGS. 5 and 8 for example) and a controller, which may be included in one or more processors 1304. The one or more driver circuits may be configured to decode ASK-modulated messages from a tank voltage or a current flowing in a transmitting coil. The plurality of charging cells may be configured to provide a charging surface. At least one coil may be configured to direct an electromagnetic field through a charge transfer area of each charging cell. The one or more driver circuits may include a first driver circuit configured to drive a transmitting coil positioned near the surface of the charging device. The controller may be configured to cause the driver circuit to provide a charging current to the transmitting coil, decode a request for lower transmission power from a modulation of the charging current, reduce the amplitude of the charging current in accordance with the request for lower transmission power when a temperature measured at a surface of the charging device is less than a threshold temperature, and initiate a cool down sequence when the temperature measured at the surface of the charging device equals or exceeds the threshold temperature. In one example, the request for lower transmission power may be provided in an ASK-modulated signal superimposed on the charging current.

In one example, one or more sensors may be thermoconductively coupled to a charging surface of the apparatus 1300 and configured to provide periodic temperature measurements of at least a portion of the surface of the charging device. The threshold temperature level is obtained from a prior calibration performed during a charging procedure. The temperature measured at the surface of the charging device equaling or exceeding the threshold temperature may be indicative of a device being charged that has an internal temperature that exceeds a temperature limit.

In some examples, the threshold voltage level is maintained in a lookup table. The lookup table may include a threshold temperature for each of a plurality of device types. The controller may be further configured to provide a minimum transmission power in response to the request for lower transmission power when initiating a cool down sequence. The controller may be further configured to determine a gradient in a time series of temperature measurements measured at the surface of the charging device, and terminate the charging current when the gradient in the time series of temperature measurements indicates that the surface of the charging device will remain above a restart temperature defined for a device being charged for a cool-down duration.

In some examples, the controller is further configured to determine a gradient in a time series of temperature measurements measured at the surface of the charging device, and may reduce power output of one or more other driver circuits in the charging device when the gradient in the time series of temperature measurements indicates that the surface of the charging device will remain above a restart temperature defined for a device being charged for a cool-down duration.

In some examples, the controller is further configured to determine a first gradient in a first time series of temperature measurements measured at the surface of the charging device, terminate the charging current when the first gradient in the first time series of temperature measurements indicates that the surface of the charging device will remain above a restart temperature defined for a device being charged for a first cool-down duration, determine a second gradient in a second time series of temperature measurements measured at the surface of the charging device after terminating the charging current, and reduce power output of one or more other driver circuits in the charging device when the second gradient in the second time series of temperature measurements indicates that the surface of the charging device will remain above the restart temperature defined for the device being charged a second cool-down duration.

In certain examples, the storage 1306 maintains instructions and information where the instructions are configured to cause the one or more processors 1304 to configure a driver circuit to drive a transmitting coil positioned near the surface of the charging device, cause the driver circuit to provide a charging current to the transmitting coil, decode a request for lower transmission power from a modulation of the charging current, reduce the amplitude of the charging current in accordance with the request for lower transmission power when a temperature measured at a surface of the charging device is less than a threshold temperature, and initiate a cool down sequence when the temperature measured at the surface of the charging device equals or exceeds the threshold temperature.

In some examples, the instructions may be configured to receive, obtain or retrieve temperature measurements from one or more sensors that are thermoconductively coupled to the surface of the charging device. The value of the threshold temperature may be obtained from a prior calibration performed during a charging procedure. The temperature measured at the surface of the charging device equaling or exceeding the threshold temperature may be indicative of a device being charged that has an internal temperature that exceeds a temperature limit.

In some examples, the threshold voltage level is maintained in a lookup table. The lookup table may include a threshold temperature for each of a plurality of device types. The instructions may be configured to provide a minimum transmission power in response to the request for lower transmission power when initiating the cool down sequence. The instructions may be configured to determine a gradient in a time series of temperature measurements measured at the surface of the charging device, and terminate the charging current when the gradient in the time series of temperature measurements indicates that the surface of the charging device will remain above a restart temperature defined for a device being charged for a cool-down duration. The instructions may be configured to determine a gradient in a time series of temperature measurements measured at the surface of the charging device, and reduce power output of one or more other driver circuits in the charging device when the gradient in the time series of temperature measurements indicates that the surface of the charging device will remain above a restart temperature defined for a device being charged for a cool-down duration.

In some examples, the instructions may be configured to determine a first gradient in a first time series of temperature measurements measured at the surface of the charging device, terminate the charging current when the first gradient in the first time series of temperature measurements indicates that the surface of the charging device will remain above a restart temperature defined for a device being charged for a first cool-down duration, determine a second gradient in a second time series of temperature measurements measured at the surface of the charging device after terminating the charging current, and reduce power output of one or more other driver circuits in the charging device when the second gradient in the second time series of temperature measurements indicates that the surface of the charging device will remain above the restart temperature defined for the device being charged a second cool-down duration.

Figure 14:
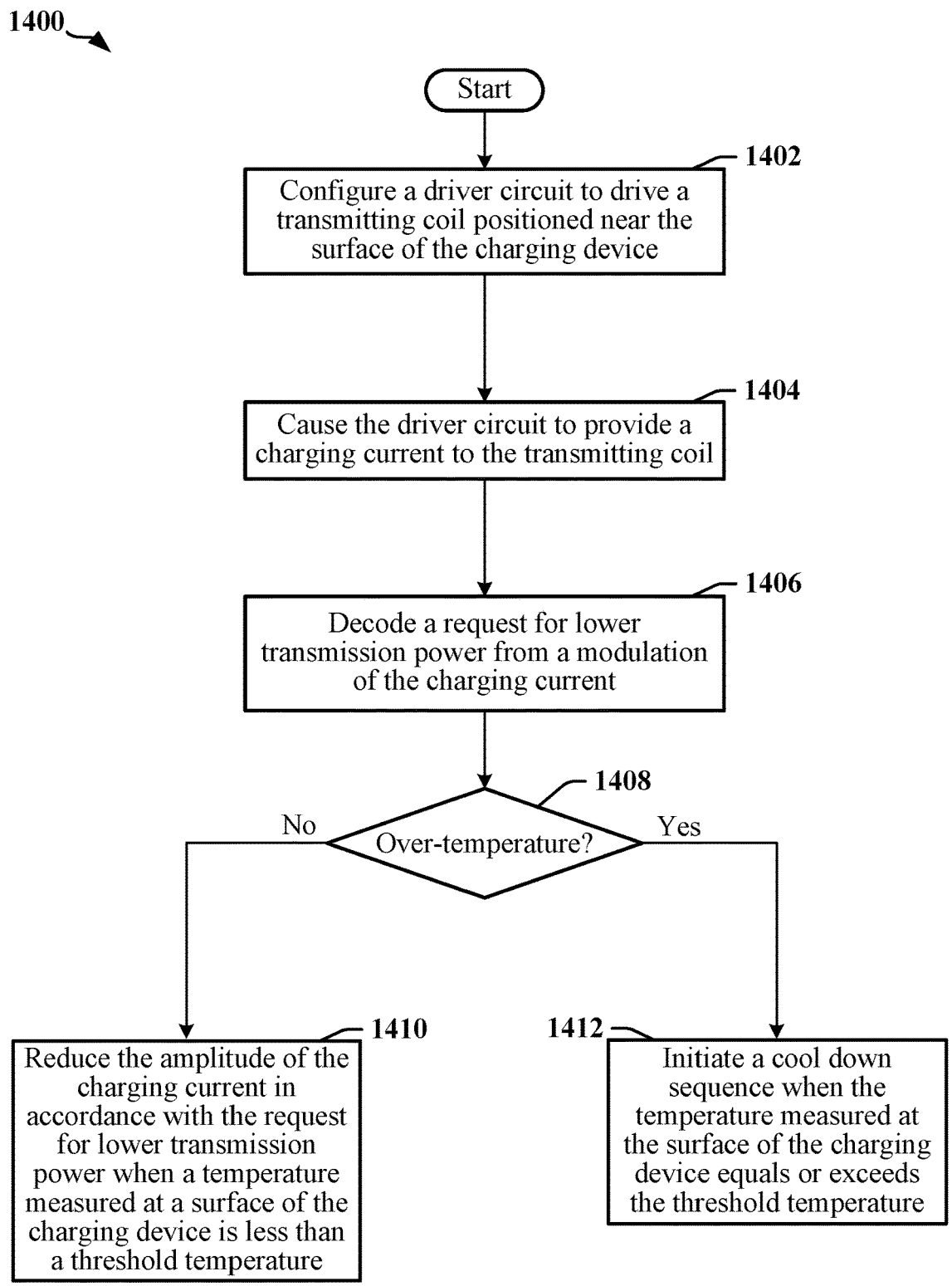
FIG. 14 illustrates a second example of a method for managing thermal cooling in a device being charged by a multi-coil wireless charging system in accordance with certain aspects of this disclosure.

FIG. 14 is a flowchart 1400 illustrating a method for operating a charging device in accordance with certain aspects of this disclosure. The method may be performed using a controller in the charging device. At block 1402, the controller may configure a driver circuit to drive a transmitting coil positioned near the surface of the charging device. At block 1404, the controller may cause the driver circuit to provide a charging current to the transmitting coil. At block 1406, the controller may decode a request for lower transmission power from a modulation of the charging current. At block 1408, the controller may determine whether an overtemperature condition exists or is indicated in a device being charged. The overtemperature condition may correspond to a temperature of a battery exceeding a maximum temperature defined by standards, protocol or a designer. The overtemperature condition may be indicated when a temperature measured at the surface of the charging device exceeds a threshold temperature. In one example, and at block 1410, the controller may reduce the amplitude of the charging current in accordance with the request for lower transmission power when a temperature measured at a surface of the charging device is less than the threshold temperature. In another example, and at block 1412, the controller may initiate a cool down sequence when the temperature measured at the surface of the charging device equals or exceeds the threshold temperature.

In some examples, the controller may receive temperature measurements from one or more sensors that are thermoconductively coupled to the surface of the charging device. A sensor may be thermoconductively coupled to the surface of the charging device when it is embedded in the surface, or fixed or attached to the surface of the charging device using a thermally conductive adhesive, for example. In some instances, the value of the threshold temperature may be obtained from a prior calibration performed during a charging procedure. In some instances, the temperature measured at the surface of the charging device equaling or exceeding the threshold temperature is indicative of a device being charged that has an internal temperature that exceeds a temperature limit.

In certain examples, the threshold voltage level is maintained in a lookup table. The lookup table may include a threshold voltage level for each of a plurality of device types.

In certain examples, a cool down sequence may be initiated by providing a minimum transmission power in response to the request for lower transmission power. A gradient in a time series of temperature measurements measured at the surface of the charging device may be determined, estimated or calculated. The charging current may be terminated when the gradient in the time series of temperature measurements indicates that the surface of the charging device will remain above a restart temperature defined for a device being charged for a cool-down duration. Power output of one or more other driver circuits in the charging device may be reduced when the gradient in the time series of temperature measurements indicates that the surface of the charging device will remain above a restart temperature defined for a device being charged for a cool-down duration.

In certain examples, a first gradient in a first time series of temperature measurements measured at the surface of the charging device may be determined. The charging current may be terminated when the first gradient in the first time series of temperature measurements indicates that the surface of the charging device will remain above a restart temperature defined for a device being charged for a first cool-down duration. The first cool-down duration may be defined by standards, protocol or a system designer. A second gradient in a second time series of temperature measurements measured at the surface of the charging device may be determined after terminating the charging current. Power output of one or more other driver circuits in the charging device may be reduced when the second gradient in the second time series of temperature measurements indicates that the surface of the charging device will remain above the restart temperature defined for the device being charged a second cool-down duration.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A non-transitory processor-readable storage medium comprising code that, when executed by a processing circuit, causes the processing circuit to:
   configure a driver circuit to drive a transmitting coil positioned near a surface of the charging device, wherein the charging device is a multi-device, multi-coil wireless charging device;
   cause the driver circuit to provide a charging current to the transmitting coil;
   decode a request for lower transmission power, the request being encoded by a device being charged in a signal superimposed on the charging current;
   obtain a measurement of temperature at a surface of the charging device after receiving the request for lower transmission power;
   reduce transmission power by reducing amplitude of the charging current in accordance with the request for lower transmission power when the temperature measured at-the surface of the charging device is less than a threshold temperature; and
   initiate a cool down sequence when the temperature measured at the surface of the charging device equals or exceeds the threshold temperature, wherein initiating a cool down sequence includes providing a minimum transmission power.

2. The non-transitory processor-readable storage medium of claim 1, wherein the processing circuit is configured to receive temperature measurements from one or more sensors that are thermoconductively coupled to the surface of the charging device.

3. The non-transitory processor-readable storage medium of claim 1, wherein the threshold temperature is configured based on a prior calibration performed during a charging procedure.

4. The non-transitory processor-readable storage medium of claim 1, wherein the temperature measured at the surface of the charging device being equal to or exceeding the threshold temperature is indicative of a device being charged that has an internal temperature that exceeds a temperature limit.

5. The non-transitory processor-readable storage medium of claim 1, wherein the threshold temperature is defined using a lookup table that relates temperature measured at the surface of the charging device to estimates of internal temperatures of a device being charged by the charging device.

6. The non-transitory processor-readable storage medium of claim 5, wherein the lookup table includes estimates of internal temperatures for each of a plurality of device types.

7. The non-transitory processor-readable storage medium of claim 1, wherein a limited duration is defined for the cool down sequence.

8. The non-transitory processor-readable storage medium of claim 7, wherein the code causes the processing circuit to:
   determine a gradient in a time series of temperature measurements measured at the surface of the charging device; and
   terminate the charging current when the gradient in the time series of temperature measurements indicates that the surface of the charging device will remain above a restart temperature defined for a device being charged for a cool-down duration.

9. The non-transitory processor-readable storage medium of claim 7, wherein the code causes the processing circuit to:
   determine a gradient in a time series of temperature measurements measured at the surface of the charging device; and
   reduce power output of one or more other driver circuits in the charging device when the gradient in the time series of temperature measurements indicates that the surface of the charging device will remain above a restart temperature defined for a device being charged for a cool-down duration.

10. The non-transitory processor-readable storage medium of claim 7, wherein the code causes the processing circuit to:
   determine a first gradient in a first time series of temperature measurements measured at the surface of the charging device;
   terminate the charging current when the first gradient in the first time series of temperature measurements indicates that the surface of the charging device will remain above a restart temperature defined for a device being charged for a first cool-down duration;
   determine a second gradient in a second time series of temperature measurements measured at the surface of the charging device after terminating the charging current; and
   reduce power output of one or more other driver circuits in the charging device when the second gradient in the second time series of temperature measurements indicates that the surface of the charging device will remain above the restart temperature defined for the device being charged a second cool-down duration.

* * * * *